US012459088B2

(12) United States Patent
Wang et al.

(10) Patent No.: US 12,459,088 B2
(45) Date of Patent: Nov. 4, 2025

(54) NAIL GUIDING MEMBER AND NAIL GUN INCLUDING THE SAME

(71) Applicant: APEX MFG. CO., LTD., Taichung (TW)

(72) Inventors: Jing-Li Wang, Taichung (TW); Bo-Shun Chen, Taichung (TW)

(73) Assignee: APEX MFG. CO., LTD., Taichung (TW)

( * ) Notice: Subject to any disclaimer, the term of this patent is extended or adjusted under 35 U.S.C. 154(b) by 0 days.

(21) Appl. No.: 18/231,380

(22) Filed: Aug. 8, 2023

(65) Prior Publication Data

US 2025/0050482 A1 Feb. 13, 2025

(51) Int. Cl.
*B25C 5/16* (2006.01)
*B25C 1/00* (2006.01)

(52) U.S. Cl.
CPC .................................... *B25C 1/005* (2013.01)

(58) Field of Classification Search
CPC .. B25C 1/00; B25C 1/005; B25C 5/00; B25C 5/16; B25C 5/1606; B25C 5/1637; B25C 5/1641; B25C 1/001; B25C 5/1644
See application file for complete search history.

(56) References Cited

U.S. PATENT DOCUMENTS 2,959,786 A * 11/1960 Peterssen ................ B25C 5/085 227/86
4,340,331 A * 7/1982 Savino .................. B25C 5/0257 411/457
6,056,182 A * 5/2000 Chen ..................... B25C 5/1665 227/123
9,221,163 B2 * 12/2015 Wang .................... B25C 5/1637
12,064,854 B2 * 8/2024 Ji ............................ B25C 1/005
2004/0084499 A1 * 5/2004 Tsai ........................ B25C 1/005 227/123
2012/0286018 A1 * 11/2012 Wang ........................ B25C 5/11 227/139
2018/0093370 A1 * 4/2018 Yip ......................... B25C 1/005
2021/0354275 A1 * 11/2021 Ji .............................. B25C 5/06

* cited by examiner

*Primary Examiner* — Gloria R Weeks
(74) *Attorney, Agent, or Firm* — Muncy, Geissler, Olds & Lowe, P.C.

(57) ABSTRACT

A nail guiding member integrally formed of one piece is provided. The nail guiding member includes a plate body, a recess and a rib. The plate body includes a first side, the recess is disposed on the first side and includes two side walls and a nail outlet between the two side walls, the rib is fixedly disposed on and protrusive from a bottom surface of the recess and is lower than the first side, the rib extends toward an nail outlet, and the rib is closer to one of the two side walls. A nail gun includes the nail guiding member, and further includes: a gun body including the nail rail movably disposed thereinside; and a striker disposed in the gun body and movable to be between the nail rail and the recess of the nail guiding member.

8 Claims, 10 Drawing Sheets

NAIL GUIDING MEMBER AND NAIL GUN INCLUDING THE SAME

BACKGROUND OF THE INVENTION

Field of the Invention

The present invention relates to a nail guiding member and a nail gun including the same.

Description of the Prior Art

A nail gun uses a striker to hit the nail so that the nail can be nailed into the target object for fastening. In order to keep the nail in the nail track accurately during striking, or to prevent the nail from being skewed and causing the nail to be stuck, some conventional nail guns are each provided with nail guiding member in front of the nail rail, to keep the nail in the accurate position where the nail is ready to be struck.

However, the conventional nail guiding member of a nail gun can only be applied to a single type and size of nails, and is not suitable for nails of different shapes and sizes; otherwise, the nail is prone to skew, twist or deformation, which results in the problem of jammed or stuck nails.

The present invention is, therefore, arisen to obviate or at least mitigate the above-mentioned disadvantages.

SUMMARY OF THE INVENTION

The main object of the present invention is to provide a nail guiding member and a nail gun including the same which are suitable for nails of different shapes and widths.

To achieve the above and other objects, a nail guiding member is provided, and nail guiding member is configured to be installed in a nail gun having a nail rail, uprightly arranged in front of the nail rail, and integrally formed of one piece. The nail guiding member includes a plate body, a recess and a rib. The plate body includes a first side configured to be arranged to face the nail rail, the recess is disposed on the first side and includes two side walls and a nail outlet between the two side walls, the rib is fixedly disposed on and protrusive from a bottom surface of the recess and is lower than the first side, the rib extends toward the nail outlet, and the rib is closer to one of the two side walls than the other of the two side walls.

To achieve the above and other objects, a nail gun including the nail guiding member is provided, wherein the nail gun further includes: a gun body including the nail rail movably disposed thereinside; and a striker disposed in the gun body and movable to be between the nail rail and the recess of the nail guiding member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
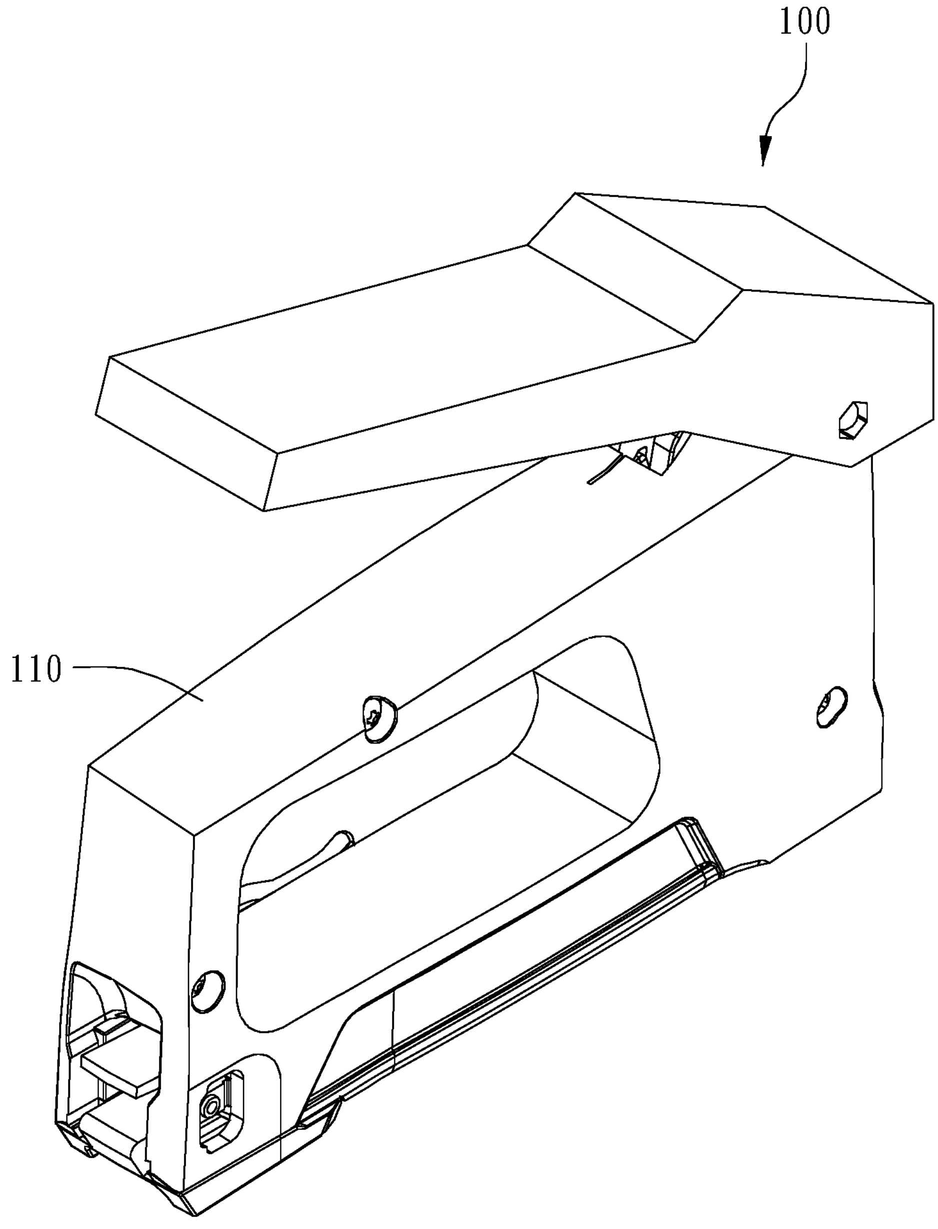
FIG. 1 is a stereogram of a nail gun of an exemplary embodiment of the present invention.
Figure 2:
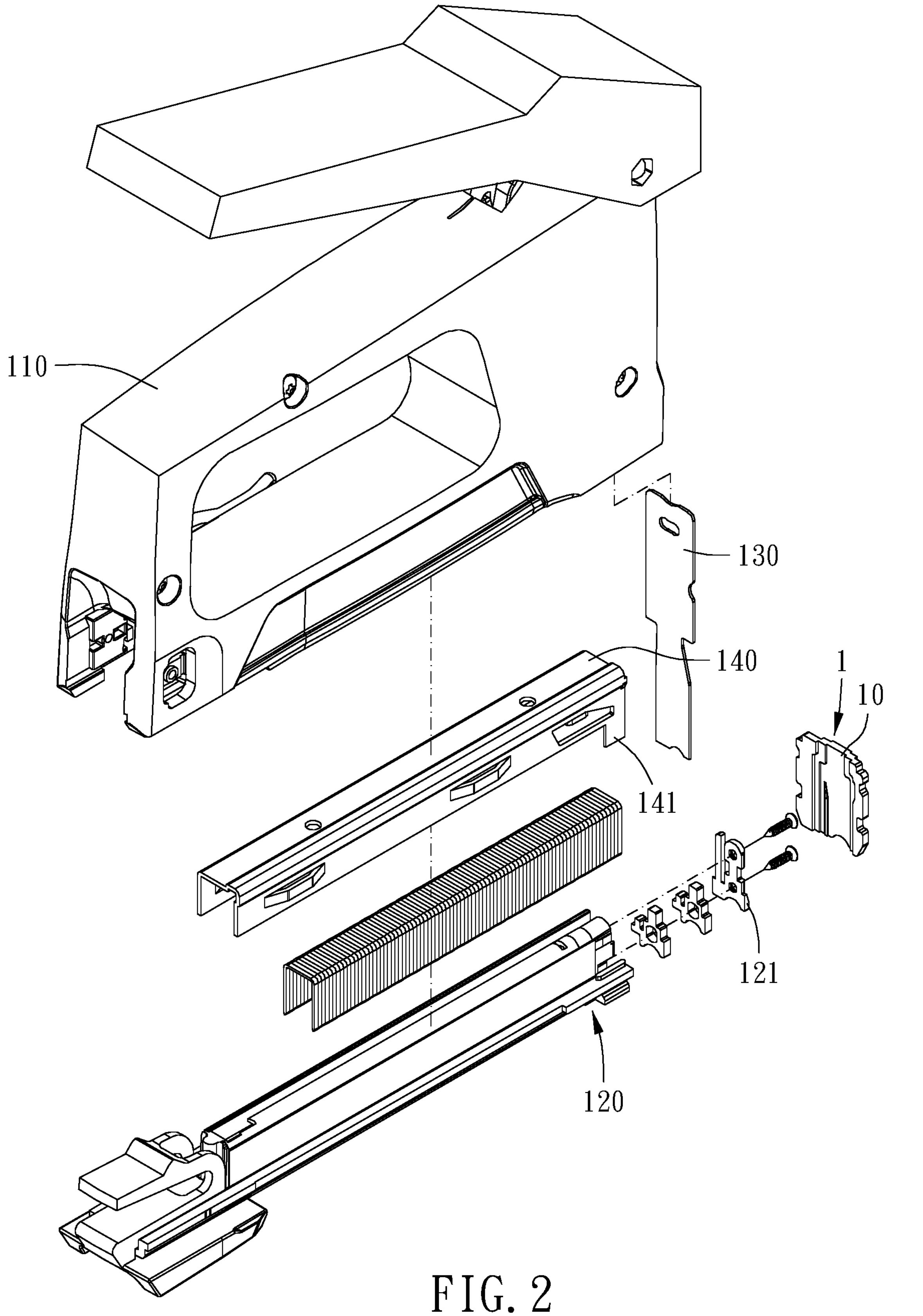
FIG. 2 is a breakdown drawing of the nail gun of an exemplary embodiment of the present invention.
Figure 3:
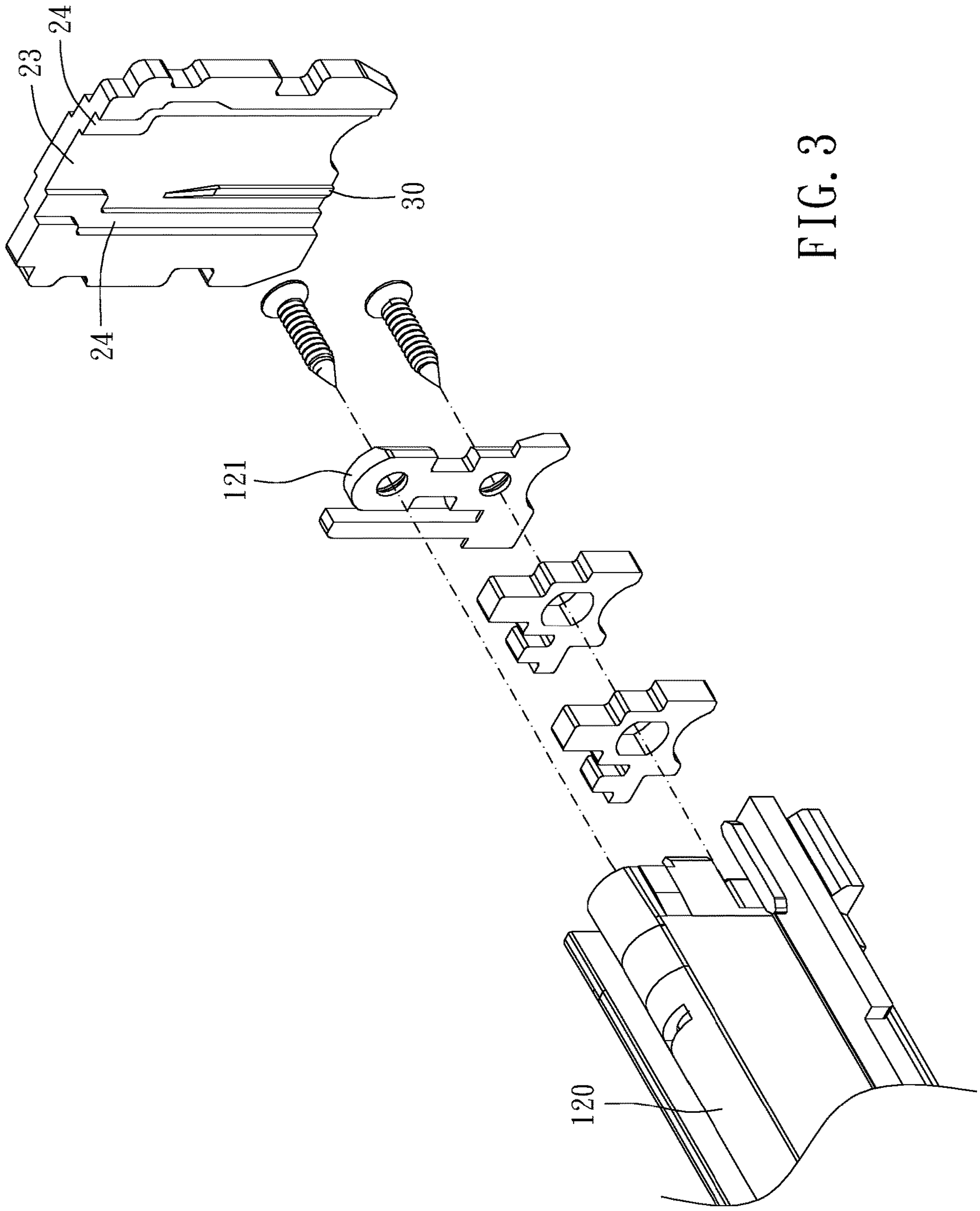
FIG. 3 is a partial breakdown drawing of an exemplary embodiment of the present invention.
Figure 4:
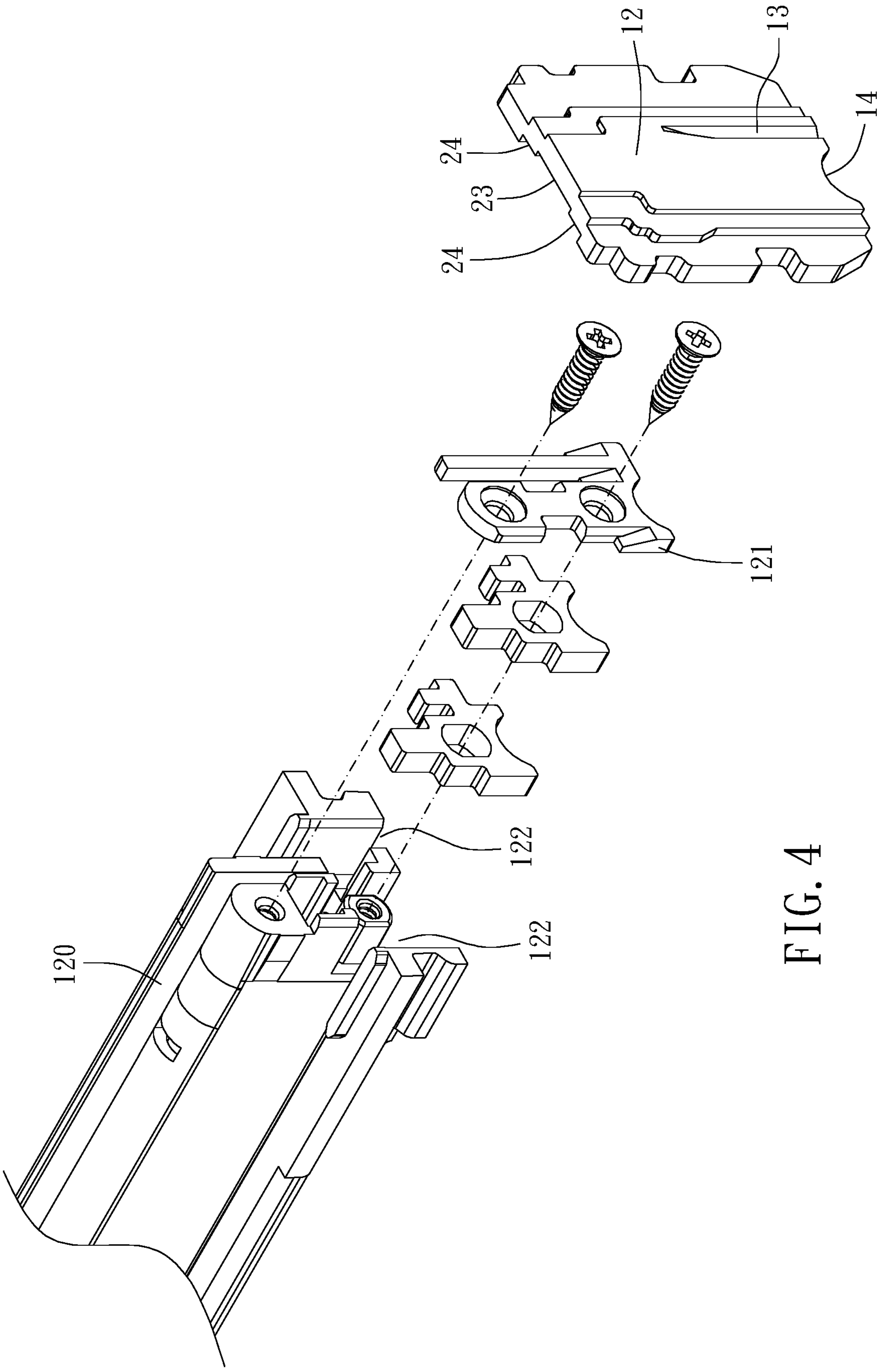
FIG. 4 is another partial breakdown drawing of an exemplary embodiment of the present invention.
Figure 5:
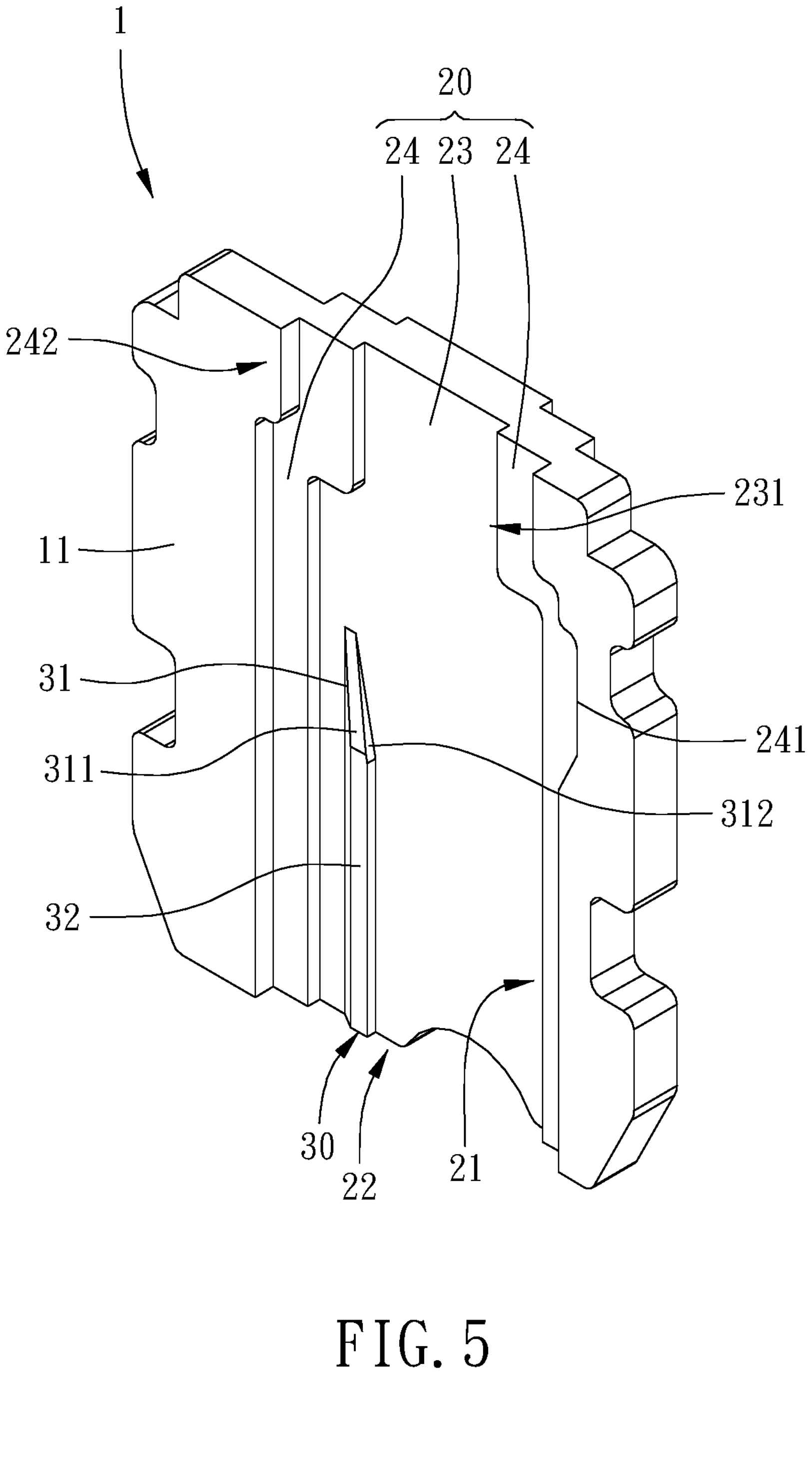
FIG. 5 is a stereogram of a nail guiding member of an exemplary embodiment of the present invention.
Figure 6:
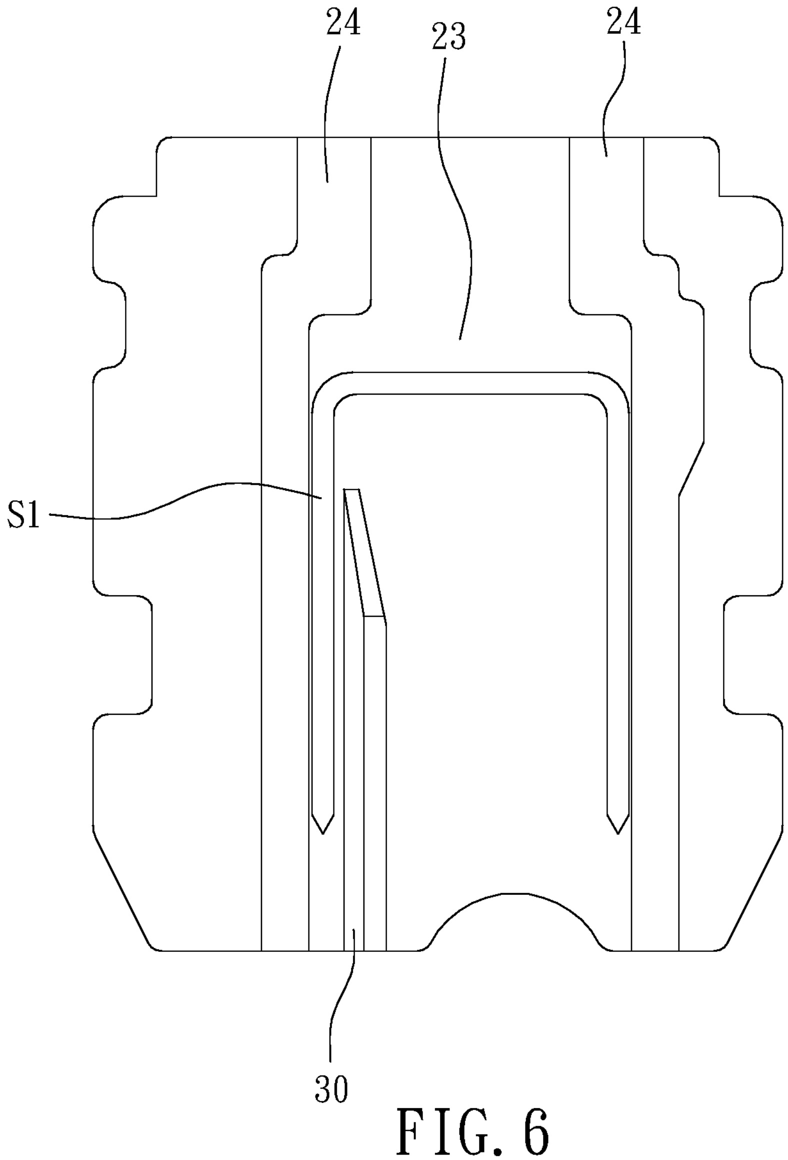
FIGS. 6-9 are drawings showing the nail guiding member being applied to various nails according to an exemplary embodiment of the present invention.
Figure 7:
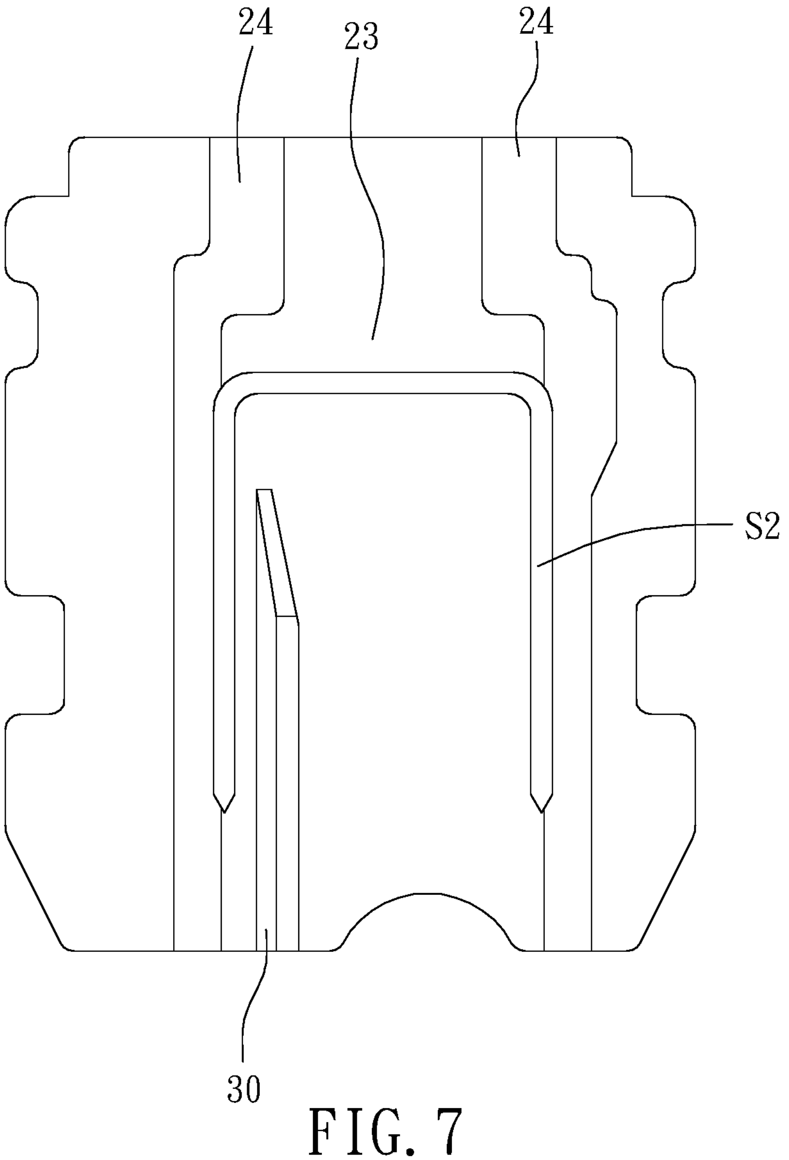
Figure 8:
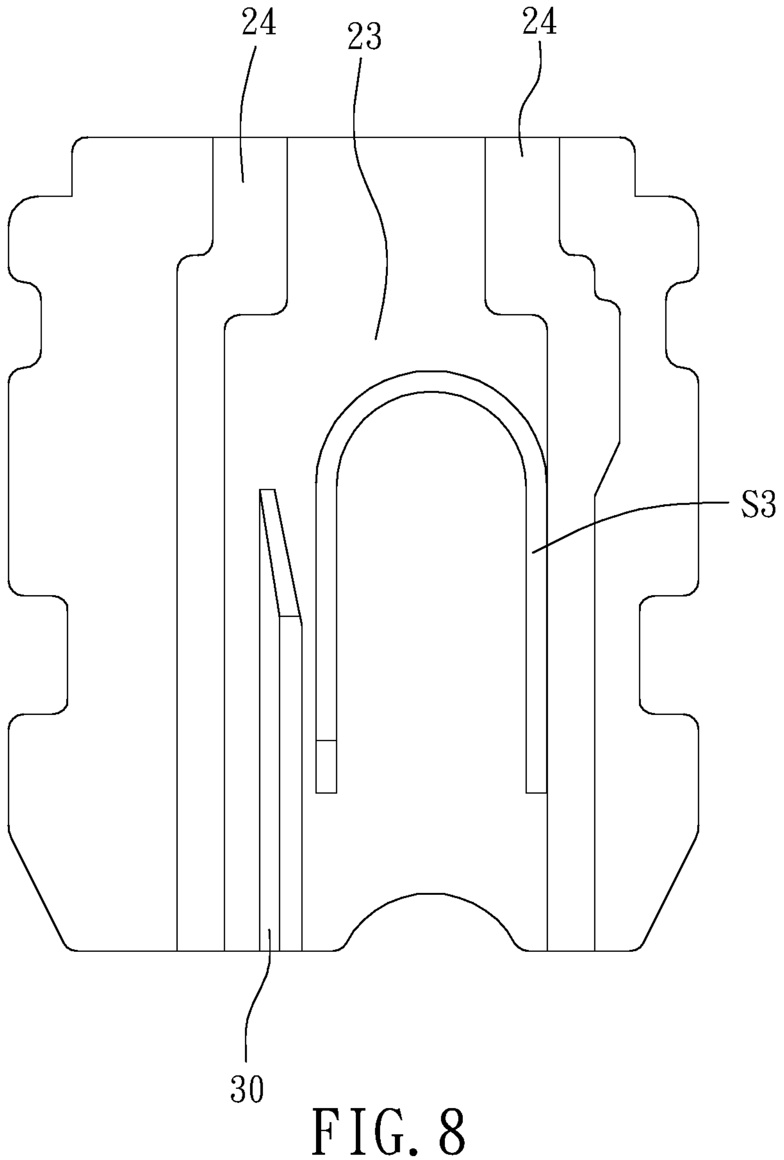

Please refer to FIGS. 1 to 10 for an exemplary embodiment of the present invention. A nail guiding member 1 and a nail gun 100 are provided. The nail guiding member 1 is configured to be installed in a nail gun 100 having a nail rail 120 and uprightly arranged in front of the nail rail 120. The nail guiding member 1 includes a plate body 10, a recess 20 and a rib 30. The plate body 10 includes a first side 11 configured to be arranged to face the nail rail 120, the recess 20 is disposed on the first side 11 and includes two side walls 21 and a nail outlet 22 between the two side walls 21, the rib 30 is fixedly disposed on and protrusive from a bottom surface of the recess 20 and is lower than the first side 11, the rib 30 extends toward the nail outlet 22, and the rib 30 is closer to one of the two side walls 21 than the other of the two side walls 21. As such, the nail guiding member is suitable for nails of different shapes and widths (such as U-shaped, T-shaped or the like).

Figure 9:
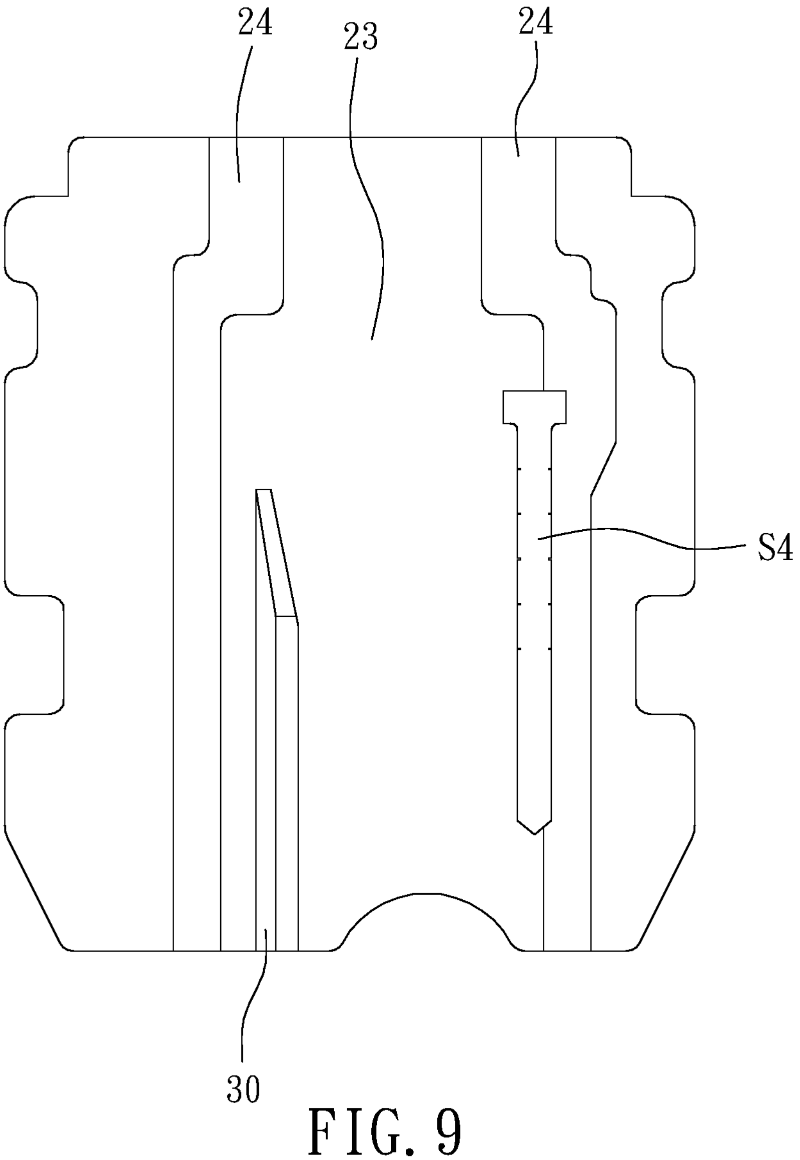
Figure 10:
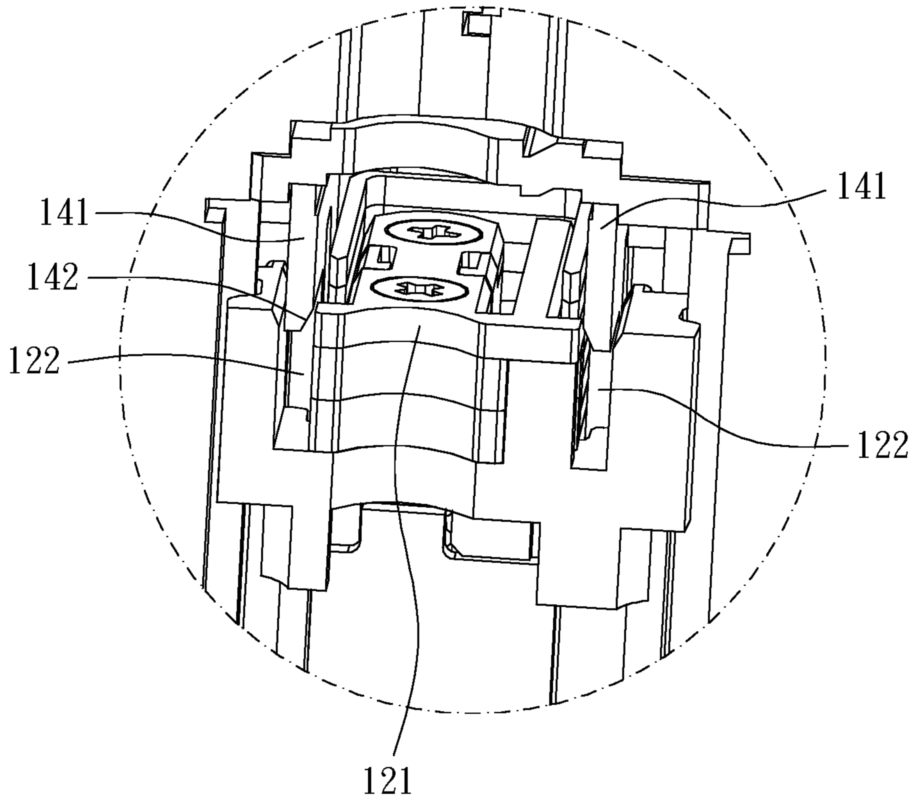
FIG. 10 is a partial enlargement of an exemplary embodiment of the present invention.

Preferably, the nail guiding member 1 is integrally formed of one piece, which is easy and quick to manufacture, and has good structural strength. The plate body 10 is three-staged, a second side 12 of the plate body 10 includes a groove 13 recessed toward the first side 11 and corresponding to the rib 30, and the rib 30 may be formed by pressing. The recess 20 includes a first recess portion 23 and two second recess portions 24 next to opposing sides of the first recess portion 23, respectively. The two second recess portions 24 are open on the first side 11, and the rib 30 is protrusive from a bottom surface of the first recess portion 23. The side wall of one the two second recess portions 24 includes a side slot 241, and the rib 30 is protrusive beyond the first recess portion 23 and lower than the first side 11. The first recess portion 23 is configured to receive a U-shaped nail S1 of a relatively smaller size (FIG. 6), the second recess portion 24 is configured to receive a U-shaped nail S2 of a relatively larger size (FIG. 7), the space between the rib 30 and a side wall of the first recess portion 23 is configured to receive a U-shaped nail S3 (FIG. 8), and the space between a side wall of one the two second recess portions 24 and the nail rail 120 is configured to receive a T-shaped nail S4 disposed on a bottom surface of the second recess portion 24 (FIG. 9).

In this embodiment, the first recess portion 23 includes a first necked portion 231 remote from the nail outlet 22, and the two second recess portions 24 define a second necked portion 242 corresponding to and wider than the first necked portion 231. The plate body 10 further includes a concave surface 14 located between the rib 30 and one of the two side walls 21. The first necked portion 231 and the second necked portion 242 can prevent the U-shaped nail from disengaging upwardly; the side slot 241 facilitates installation and guidance of the T-shaped nail; and the concave surface 14 can prevent the nail from being jammed in the nail outlet.

The rib 30 includes an inclined section 31 and a straight section 32 connected to the inclined section 31, the inclined section 31 extends and tilts from the bottom surface of the recess 20 toward the straight section 32, and the straight section 32 extends toward the nail outlet 22. The inclined section 31 includes a first inclined surface 311 extending and tilting from the bottom surface of the recess 20 toward the straight section 32, and a second inclined surface 312 extending and tilting from the bottom surface of the recess 20 toward one of the two side walls 21. The first inclined surface 311 and the second inclined surface 312 facilitate guiding the discharge of the U-shaped nail, and the straight section 32 effectively facilitates guidance and limitation of the U-shaped nail.

The present invention further provides a nail gun 100 including the nail guiding member 1. The nail gun 100 further includes a gun body 110 and a striker 120. The gun body 110 includes the nail rail 120 movably disposed thereinside, and the striker 130 is disposed in the gun body 110 and movable to be between the nail rail 120 and the recess 20 of the nail guiding member 1, for striking the nail.

Preferably, a metal plate 121 is disposed on a front end of the nail rail 120 and faces the nail guiding member 1. The metal plate 121 has high hardness and structural strength, thus avoiding the nail rail 120 from being damaged. The nail gun 100 further includes a cover 140 for covering the nail, and the nail rail 120 is slidably mounted to the cover 140. Preferably, the cover 140 includes at least one guiding projection 141, the nail rail 120 includes at least one guiding groove 122 on a distal end thereof, and the nail rail 120 is movable relative to the cover 140 so that the at least one guiding projection 141 is movable to be inserted in the at least one guiding groove 122. The at least one guiding projection 141 preferably includes a guiding bevel 142, which stably engages the nail rail 120 and the cover 140.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A nail guiding member configured to be installed in a nail gun having a nail rail, uprightly arranged in front of the nail rail, integrally formed of one piece, and including a plate body, a recess and only one rib, the plate body including a first side configured to be arranged to face the nail rail, the recess being disposed on the first side and including two side walls and a nail outlet between the two side walls, the rib integrally extending from the plate body, the rib being fixedly disposed on and protrusive from a bottom surface of the recess and being lower than the first side, the rib extending from a point distanced from an upper edge of the plate body toward the nail outlet, the rib being closer to one of the two side walls than the other of the two side walls;

wherein the rib includes an inclined section and a straight section connected to the inclined section, the inclined section extends and tilts from the bottom surface of the recess toward the straight section, and the straight section extends toward the nail outlet;

wherein the inclined section includes a first inclined surface extending and tilting from the bottom surface of the recess toward the straight section, and a second inclined surface extending and tilting from the bottom surface of the recess toward one of the two side walls.

2. The nail guiding member of claim 1, wherein a second side of the plate body includes a groove recessed toward the first side and corresponding to the rib.

3. The nail guiding member of claim 1, wherein the recess includes a first recess portion and two second recess portions next to opposing sides of the first recess portion respectively, the two second recess portions are open on the first side, and the rib is protrusive from a bottom surface of the first recess portion.

4. The nail guiding member of claim 1, wherein the plate body is three-staged.

5. The nail guiding member of claim 1, wherein a second side of the plate body includes a groove recessed toward the first side and corresponding to the rib; the recess includes a first recess portion and two second recess portions next to opposing sides of the first recess portion respectively, the two second recess portions are open on the first side, and the rib is protrusive from a bottom surface of the first recess portion; the plate body is three-staged; the first recess portion includes a first necked portion remote from the nail outlet, the two second recess portions define a second necked portion corresponding to and wider than the first necked portion; the plate body further includes a concave surface located between the rib and one of the two side walls; the rib is protrusive beyond the first recess portion and lower than the first side; the side wall of one the two second recess portions includes a side slot.

6. A nail gun including the nail guiding member of claim 1, and further including:

a gun body including the nail rail movably disposed thereinside; and a striker disposed in the gun body and movable to be between the nail rail and the recess of the nail guiding member.

7. The nail gun of claim 6, wherein a metal plate is disposed on a front end of the nail rail and faces the nail guiding member.

8. The nail gun of claim 6, wherein further includes a cover, the nail rail is slidably mounted to the cover, the cover includes at least one guiding projection, the nail rail includes at least one guiding groove, and the nail rail is movable relative to the cover so that the at least one guiding projection is movable to be inserted in the at least one guiding groove.

* * * * *